United States Patent

[11] 3,624,801

| [72] | Inventor | Thomas E. Gannon |
| | | Oakland, Calif. |
| [21] | Appl. No. | 25,494 |
| [22] | Filed | Apr. 3, 1970 |
| [45] | Patented | Nov. 30, 1971 |
| [73] | Assignee | Grove Valve and Regulator Company |
| | | Oakland, Calif. |

[54] FLEXIBLE TUBE VALVE
10 Claims, 4 Drawing Figs.

[52] U.S. Cl............................................. 251/5,
251/61.1
[51] Int. Cl............................................. F16k 7/07
[50] Field of Search............................. 251/5, 61.1;
137/525

[56] References Cited
UNITED STATES PATENTS

| 994,168 | 6/1911 | Koppitz...................... | 251/5 X |
| 2,247,363 | 7/1941 | Dunn.......................... | 251/5 X |
| 2,622,620 | 12/1952 | Annin.......................... | 251/5 |
| 2,706,612 | 4/1955 | Ratelband.................... | 251/5 |

FOREIGN PATENTS

| 651,039 | 3/1951 | Great Britain................ | 251/5 |
| 1,039,069 | 8/1966 | Great Britain................ | 251/5 |

Primary Examiner—M. Cary Nelson
Assistant Examiner—Richard Gerard
Attorney—Melvin R. Stidham ABSTRACT: A flexible tube valve including a core having an annular series of longitudinal ribs, the outer surfaces of which define an interrupted frustoconical surface that merges with an annular sealing surface on a barrier between the inlet and outlet flow passages. The barrier includes a reinforcing conical portion integral with the ribs and extending toward the outlet, with spaces between the ribs forming outflow passages around the cone. A frustoconical expansible tube is stretched around the ribs and the sealing surface with a control pressure around the tube normally causing it to seal against flow.

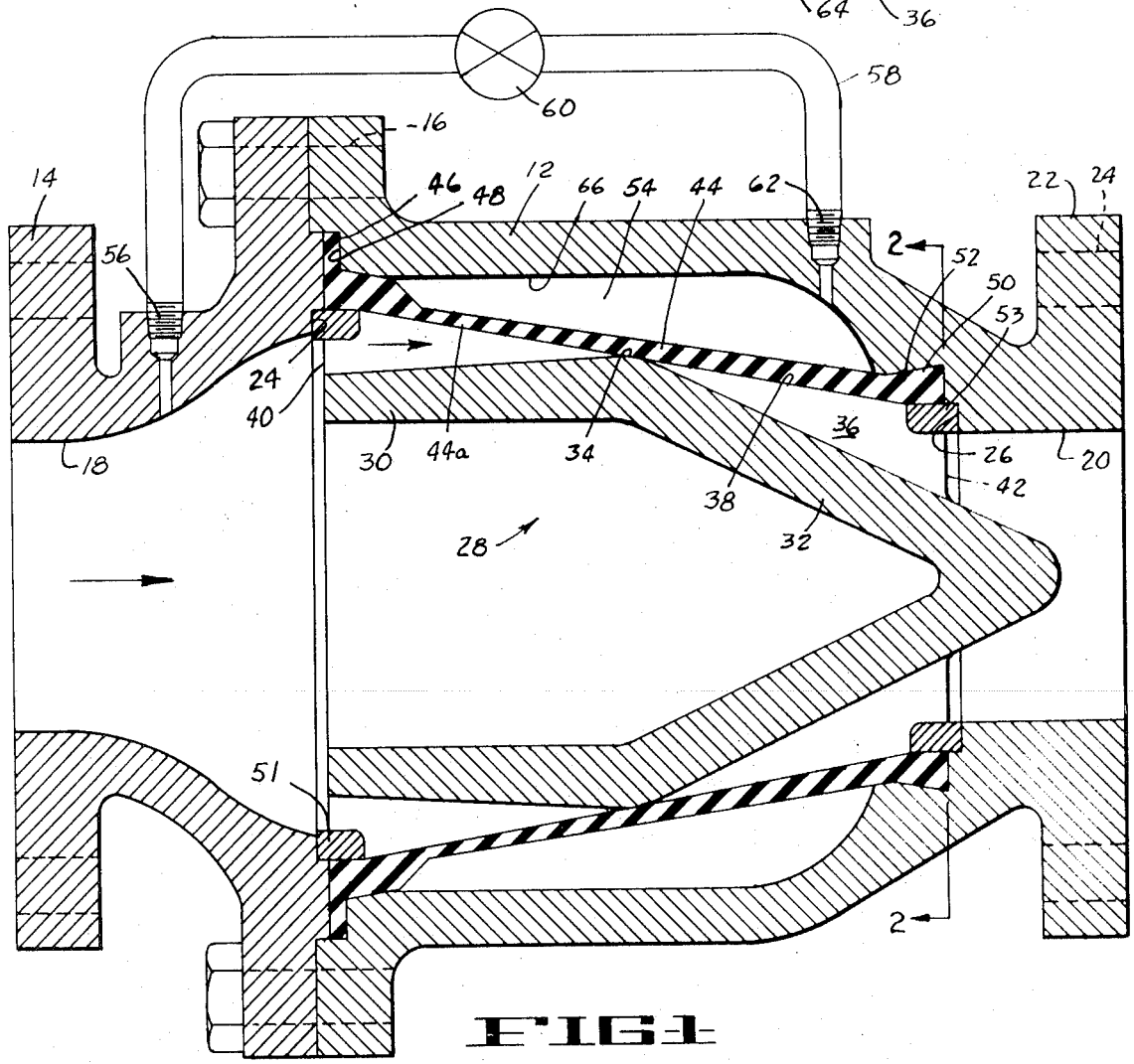
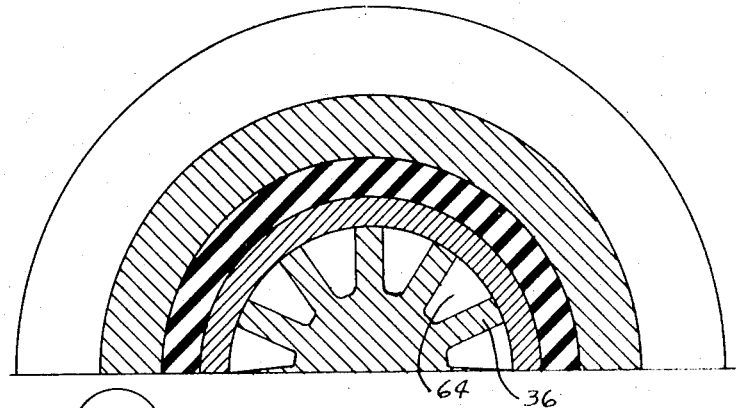
INVENTOR.
THOMAS E. GANNON
BY Melvin R. Seidhan
ATTORNEY

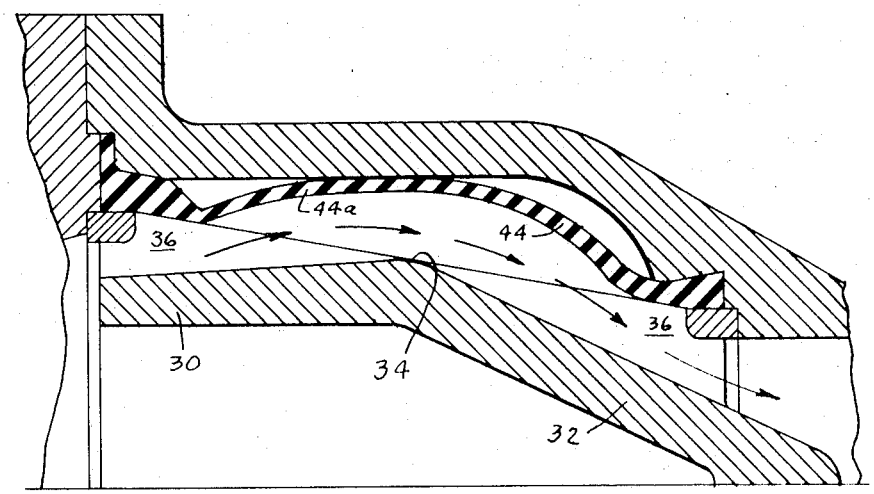
FIG-4-
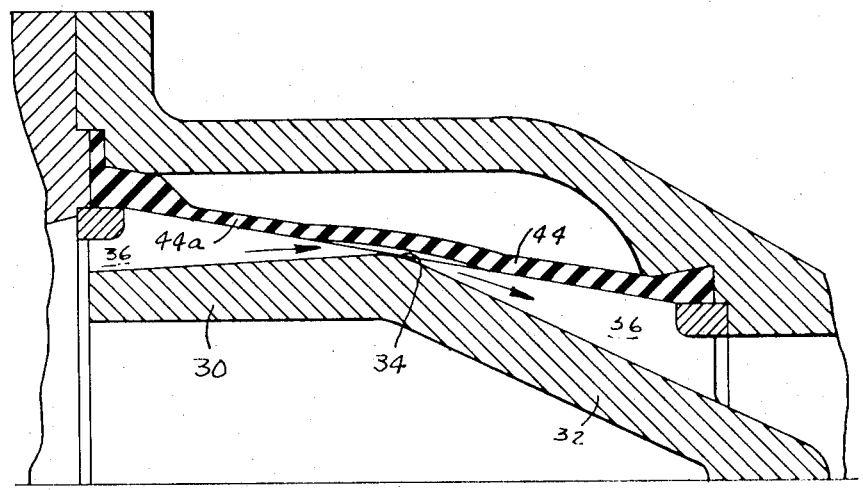
FIG-3-

3,624,801

FLEXIBLE TUBE VALVE

BACKGROUND OF THE INVENTION

This invention relates to a flexible tube valve and more particularly to a valve with an expansible tube that seals around a barrier between inlet and outlet flow passages, such as that disclosed in U.S. Pat. No. 2,353,143 granted to Austin U. Bryant on July 11, 1944 for Fluid Control Flow Device.

Briefly, the valve disclosed in the afore-mentioned patent comprises a body having inlet and outlet flow passages between which is positioned a cylindrical barrier comprising part of a core sleeve that is slotted both upstream and downstream of the barrier to provide flow paths around the barrier. An expansible sleeve of resilient material is stretched over the core sleeve to seal around the barrier and a control pressure fluid around the sleeve holds it in snug sealing engagement. However, with sufficient pressure the upstream fluid within the sleeve expands it outward and flows around the barrier and through the downstream slots to the outlet flow passage.

Control valves of the type described work very effectively and efficiently, and have been very successful commercially. However, some problem in manufacture of these valves has been encountered by reason of the difficulty in placing a cylindrical expansible sleeve under tension over its length around a larger cylindrical core sleeve. In addition, the ribs between the upstream and downstream slots have to be made exceptionally thick in cross section for high-pressure work in order to withstand the beam loading to which they are subjected.

OBJECTS OF THE INVENTION

It is, therefore, an object of this invention to provide a flexible tube valve wherein the expansible tube may be placed over a core with relative ease.

It is a further object of this invention to provide a flexible tube valve wherein there are no ribs under beam loading.

It is a further object of this invention to provide a flexible tube valve having smooth flow characteristics.

It is a further object of this invention to provide a flexible, expansible tube of varying selected thicknesses for greater control of operating characteristics.

BRIEF DESCRIPTION OF THE INVENTION

In carrying out this invention, I provide in a housing having inlet and outlet flow passages a coaxial core and barrier having a generally cylindrical portion adjacent to the inlet passages and a generally conical portion extending toward the outlet flow passage, with their surfaces merging together smoothly to form a sealing surface. A series of longitudinal ribs extend radially from the core with their outer surfaces defining a frustum of a cone merging smoothly into the sealing surface. A complementary frustoconical expansible sleeve is carried on the ribs under slight tension to seal around the sealing surface. A control pressure in the housing around the expansible tube maintains the valve closed until upstream pressure reaches a level sufficient to overcome the tube tension and surrounding control pressure. At that level, the tube expands outward whereby the spaces between the ribs surrounding the cylindrical surface form inflow passages for fluid flowing around the sealing surface and through the outflow passages between the ribs where they surround the conical surface.

BRIEF DESCRIPTION OF THE DRAWING

In the drawing:

FIG. 1 is a vertical section view of a fluid control valve embodying features of this invention;

FIG. 2 is a section view taken along line 2—2; and

FIGS. 3 and 4 are enlarged partial section views showing sequence of operation.

DESCRIPTION OF PREFERRED EMBODIMENTS

Referring now to the drawing with greater particularity, the control valve 10 of this invention comprises a body member 12 which may be cast or fabricated from rolled shapes, and an end closure 14 which is bolted by means of cap screws 16. An inlet passage 18 is cast or otherwise formed in the end closure 14 and an outlet passage 20 is formed in the body member 12. The inlet and outlet passages 18 and 20 may be surrounded by flanges 22 with holes 24 formed therein for attachment to complementary flanges (not shown) in a pipeline.

Carried coaxially within the housing as by gripping it between shoulders 24 and 26 on the end closure 14 and the body 12 respectively, is a core member 28 of a unique configuration. Specifically, the core member has a generally cylindrical portion 30 that extends coaxially with, and from the inlet passage 18, and a conical portion 32 that extends toward the outlet passage 20. The cylindrical and conical portions together form a barrier to fluid flow from the inlet 18 to the outlet passage 20, and their surfaces merge into a sealing surface 34 that will hereinafter be described.

Surrounding the core member is an annular series of longitudinal, radially extending ribs 36, the outer surfaces 38 of which are on a frustum of a cone merging into the sealing surface intermediate the ends 40 and 42 of the core barrier. If desired, the sealing surface may be elevated slightly to protrude radially beyond the remaining surfaces of the ribs.

Carried on the ribs 36 under hoop tension is a complementary frustoconical expansible sleeve 44 which, being under tension, seals around and against the sealing surface 34. The inlet end of the expansible sleeve may have a radial flange 46 which is clamped between an internal shoulder 48 on the body and the end closure shoulder 34 in a fluid-type seal. The outlet end of the expansible sleeve is preferably made thicker at 50 to squeeze between surfaces 38 of the ribs and an undercut inner surface 52 of the body 12, thus sealing at the downstream end. Support rings 51 and 53 may be carried across the ribs 36 to provide continuous annular support for the resilient tube ends.

The space 54 within the body around the expansible sleeve is adapted to receive a control pressure fluid as by directing a fluid from an upstream passage tap 56 through a line 58 and pilot valve 60 to a control valve inlet tap 62. Normally, the expansible sleeve is held in firm sealing engagement by the control pressure. However, in the event the upstream pressure within the spaces 64 (FIG. 2) between the ribs 26 and around the cylindrical surface 30 is sufficient to overcome the control pressure, augmented by the hoop tension in the tube, the tube 44 is expanded outward whereby the fluid flows in the direction of the arrows (FIGS. 3 and 4) around the sealing surface 34 and through the spaces 64 between the ribs where they surround the conical surface 30. Because the cylindrical surface converges with the surfaces of the ribs toward the sealing surface the inflow passages provided between the ribs 36 increase in capacity progressively as the expansible sleeve expands away from the sealing surface 34 and is forced outward against the wall 66 gradually toward the inlet end. Similarly, the diverging relationship of the rib surfaces and the conical surface 32 increases outflow capacity progressively as the valve opens. Moreover, the smooth merger of the cylindrical and conical surfaces 30 and 32 and the continuation of the conical surface to the outlet passage provides extremely smooth flow characteristics.

Because of the conical configuration of the expansible sleeve 44, it may be formed with a relatively thin wall 44a at the end of the sleeve 50 that is weaker in hoop tensile strength to insure that it will stretch outward against the surrounding wall 66, as shown in FIG. 4, and remain free of the ribs 36 until the inlet pressure is again overcome by the control pressure, thus reducing fluctuations in the tube 44.

When the expansible tube 44 is formed, the diameters along its length are normally slightly less than the corresponding diameters of the complementary ribs. Hence, in assembly, when the expansible tube is slipped over the ribs 36 as far as it will go without the application of force, the radial flange will still be displaced from the inlet end 40 of the core 28. Thereafter the expansible tube may be forced into place as by tightening the cap screws 16 after placement of the core 28 and the expansible tube in the body 12. The core will then be fully engaged within the expansible tube 44 with the tube under tension.

Because of the integral construction of the core barrier 28, the ribs are rigidly supported over their full lengths and are not under beam load. This is extremely important, particularly at high-pressure differentials, since it adds considerable strength without requirement of large rib cross sections.

While this invention has been described in conjunction with a preferred embodiment thereof, it is obvious that modifications and changes thereon may be made by those skilled in the art without departing from the spirit and scope of this invention.

What is claimed is:

1. A fluid flow control device comprising:
   a housing having inlet and outlet flow passages at opposite ends thereof,
   a core in said housing having:
   a generally cylindrical surface extending downstream from said inlet passage,
   a generally conical surface extending downstream toward said outlet passage,
   said cylindrical and conical surface merging into an intermediate sealing surface, and
   an annular series of longitudinal ribs around said core with the outer surfaces thereof defining a frustum of a cone merging with said sealing surface,
   an expansible, frustoconical tube sealed at both ends to said housing and carried on said ribs to seal around said sealing surface,
   said tube defining with said ribs fluid flow passages communicating with said inlet and outlet passages controlled by movement of said tube relative to said sealing surface, and
   means for introducing a control pressure fluid into said housing around said expansible tube.

2. The fluid flow control device defined by claim 1 wherein:
   the spaces between said ribs and around said cylindrical surface define with said tube progressively increasing inflow passages in the upstream direction, and
   the spaces between said ribs and around said conical surface define progressively increasing outflow passages in a downstream direction.

3. The fluid flow control device defined by claim 1 wherein: said expansible tube is normally stretched around said ribs.

4. The fluid flow control device defined by claim 1 wherein:
   said expansible tube has a radial flange at the inlet end thereof, and including
   a closure at the inlet end of said housing clamping said radial flange.

5. The fluid control device defined by claim 1 including
   a thick wall portion at the outlet end of said expansible tube clamped between said ribs and the wall of said housing.

6. The fluid flow control device defined by claim 2 wherein:
   said expansible tube is weaker in hoop tensile strength around said inflow passages.

7. A fluid flow control device comprising:
   a housing having inlet and outlet flow passages at opposite ends thereof,
   a barrier in said housing intermediate said inlet and outlet flow passages,
   a sealing surface around said barrier,
   an annular series of ribs around said barrier with the outer surfaces thereof defining a frustum of a cone merging with said sealing surface and extending toward said outlet passage,
   an expansible, frustoconical tube sealed at both ends to said housing and carried on said ribs to seal around said sealing surface, and
   said tube defining with said ribs fluid flow passages communicating with said inlet and outlet passages controlled by movement of said tube relative to said sealing surface, and
   means for introducing a control pressure fluid into said housing around said expansible tube.

8. The fluid flow control device defined by claim 7 including:
   an annular reinforcing core connecting and supporting the radially inner edges of said ribs.

9. The fluid flow control device defined by claim 8 wherein said reinforcing core comprises:
   a conical member integral with said barrier and ribs, merging into said sealing surface, and extending toward said outlet flow passage at a steeper angle with respect to the axis of said flow passage than that of said cone frustum.

10. The fluid flow control device defined by claim 9 wherein said ribs extend from said sealing surface toward said inlet flow passage and including
    an annular reinforcing core integral with said barrier and ribs, merging into said sealing surface, and extending toward said inlet flow passage at a lesser angle with respect to the axis of said flow passage than that of said cone frustum.

* * * * *